UNITED STATES PATENT OFFICE.

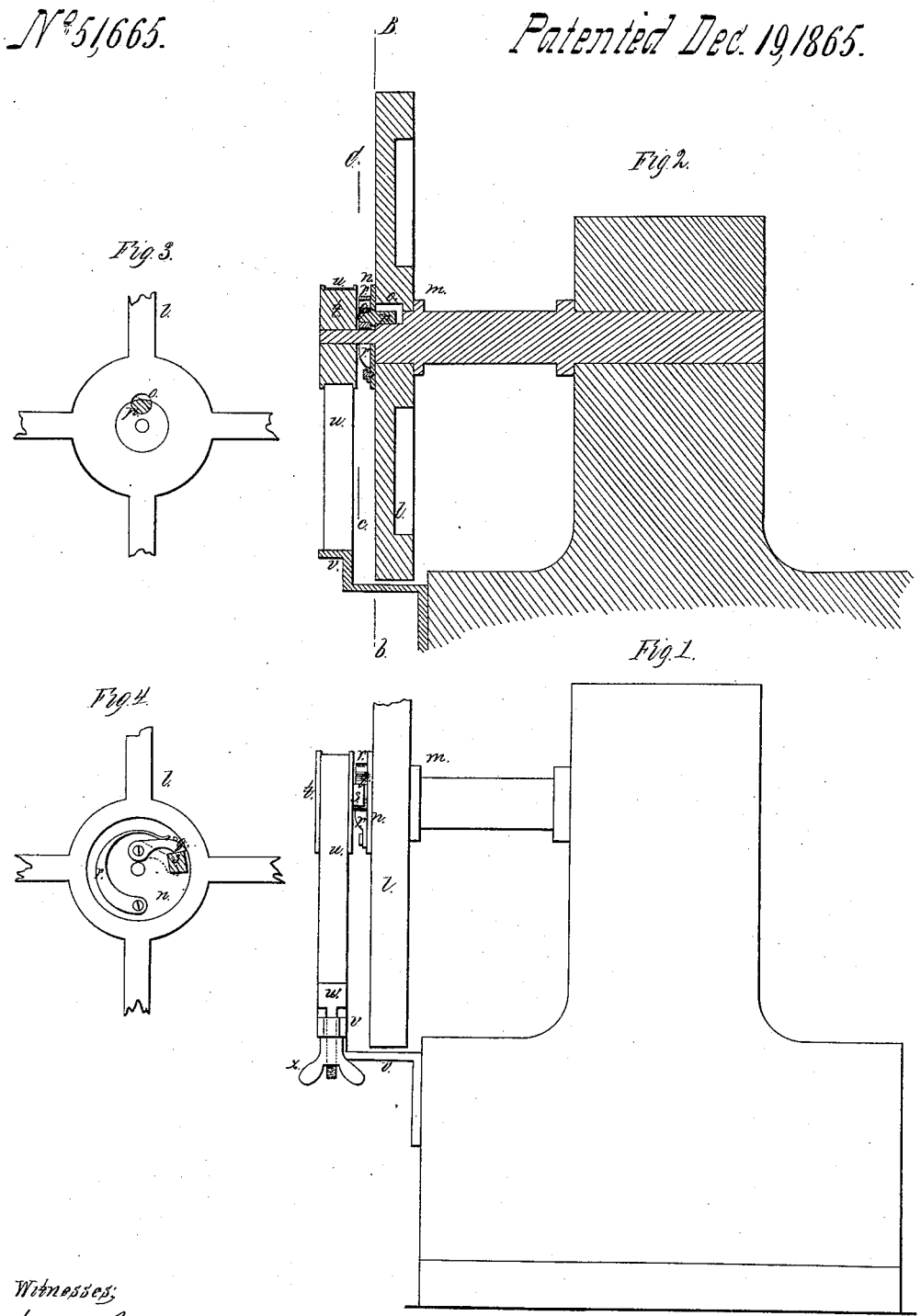

DAVID M. SMYTH, OF NEW YORK, N. Y., ASSIGNOR TO HIMSELF AND P. C. SCHUYLER, OF SAME PLACE.

IMPROVED CLUTCH FOR CONNECTING AND DISCONNECTING MACHINERY.

Specification forming part of Letters Patent No. 51,665, dated December 19, 1865.

*To all whom it may concern:*

Be it known that I, D. M. SMYTH, of the city, county, and State of New York, have invented certain new and useful Improvements in Clutches for Connecting and Disconnecting Machinery; and I do hereby declare that the following is a full, clear, and exact description thereof, reference being had to the accompanying drawings, making part of this specification, in which—

Figure 1 is a side elevation; Fig. 2, a vertical section taken in the plane of the axis of the driving-shaft, and Figs. 3 and 4 cross-sections taken at the lines B $b$ and C $c$ of Fig. 2.

The same letters indicate like parts in all the figures.

The object of my said invention is to afford a more ready and efficient means of connecting and disconnecting a shaft from the driving-pulley. For this purpose the hub of the belt-wheel $l$ is mounted to turn freely but accurately on the shaft and between collars $m$ and $n$, the one, $m$, being a shoulder on the shaft and the one, $n$, a circular plate on the outer face of the belt-wheel, but connected with the shaft, so as to turn with it.

After the hub of the belt-wheel has been properly fitted to turn on the shaft a hole, $o$, is bored parallel with the axis of the shaft, and partly in the shaft and partly in the hub of the wheel, and into this is fitted a turning stop, $p$, having a journal at one end fitted to turn in and extending through the outer collar or plate, $n$, and projecting sufficiently beyond the outer face to have attached to it an arm, $q$, by which the stop $p$ can be turned.

The periphery of the stop $p$ is so cut away that when in the position represented by full lines in Fig. 3 its outer surface will be like a continuation of the cylindrical part of the shaft, on which the belt-wheel will turn freely, and in that position of the stop the extremity of the arm $q$ will be in the position represented by full lines in Fig. 4 of the drawings; but when the arm $q$ is moved inward toward the axis of the shaft, as represented by dotted lines in Fig. 4, which is effected by the tension of a spring, $r$, the stop $p$ will then be turned in the position represented by dotted lines in Fig. 3 of the drawings, and in that position it will clutch the belt-wheel to the shaft, and thereby communicate motion to the shaft. The required motion for turning the stop $p$ to unlock or unclutch the belt-wheel is imparted to the arm $q$ against the tension of the spring $r$ by its coming in contact with a spur, $s$, projecting from the inner face of a friction-wheel, $t$, which is free to turn on the main shaft, which is there made of a reduced size.

A strap, $u$, which I prefer to make of spring-steel, is attached by one end to a bracket-piece, $v$, of the frame, passes over the periphery of the friction-wheel $t$, and the other end is attached to a stem, $w$, that slides in a hole in the bracket $v$. The stem $w$ may be threaded to receive a nut, $x$, by which to draw down the stem and make it bind on the periphery of the wheel $t$, or this can be done by a treadle or hand lever connected with the stem.

When the strap is loose the friction-wheel $t$ turns with the driving-belt wheel $l$, the arm $q$ will be held in the position in which the spring always tends to keep it, and the stop will be so turned as to clutch the wheel and shaft; but the moment the wheel $t$ is stopped, by drawing down the strap $u$ and making friction on its periphery the arm $q$ is brought in contact with the spur $s$ and the stop $p$ is turned to unclutch the shaft from the driving-wheel.

What I claim as my invention, and desire to secure by Letters Patent, is—

1. The turning stop with its spring-arm, and located at the junction of the shaft and hub of the wheel, and made partly in the periphery of the shaft and partly in the inner periphery of the hub, substantially as described, in combination with the spur, or the equivalent thereof, for turning the stop, substantially as described.

2. The friction-strap and friction-wheel, in combination with the clutch, substantially as and for the purpose specified.

DAVID M. SMYTH.

Witnesses:
WM. H. BISHOP,
ANDREW DE LACY.